United States Patent
McClellan et al.

(10) Patent No.: US 6,549,834 B2
(45) Date of Patent: *Apr. 15, 2003

(54) MOTION DETECTION AND RECORDING METHOD AND APPARATUS

(75) Inventors: Scott B. McClellan, Heber, UT (US); Robert M. Henderson, Salt Lake City, UT (US); Verlin G. Russon, Lehi, UT (US); Andras Pungor, Salt Lake City, UT (US); Mike J. Lyons, Salt Lake City, UT (US)

(73) Assignee: Independent Witness Incorporated, West Valley, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,658

(22) Filed: Jul. 24, 2001

(65) Prior Publication Data

US 2002/0072838 A1 Jun. 13, 2002

Related U.S. Application Data

(63) Continuation-in-part of application No. 09/259,782, filed on Mar. 1, 1999, now Pat. No. 6,266,588.

(51) Int. Cl.[7] ............................................. G06F 19/00
(52) U.S. Cl. .................. 701/35; 73/649; 360/6; 346/25
(58) Field of Search ............. 701/35, 36; 340/902, 340/539, 10.1, 468, 439, 438; 705/4, 35, 400; 73/649; 180/171, 274, 282; 386/46, 109, 125; 360/6, 5; 123/399, 322; 346/25

(56) References Cited

U.S. PATENT DOCUMENTS

| | | | |
|---|---|---|---|
| 4,381,829 A | | 5/1983 | Montaron .................. 180/274 |
| 4,533,962 A | * | 8/1985 | Decker et al. .................. 360/5 |
| 4,745,564 A | * | 5/1988 | Tennes et al. ............ 346/33 D |
| 5,430,432 A | * | 7/1995 | Camhi et al. ................ 180/171 |
| 5,445,024 A | | 8/1995 | Riley, Jr. et al. .............. 73/489 |
| 5,465,079 A | | 11/1995 | Bouchard et al. ........... 340/576 |
| 5,524,489 A | | 6/1996 | Twigg ...................... 73/514.38 |
| 5,540,095 A | | 7/1996 | Sherman et al. ......... 73/514.38 |
| 5,581,464 A | | 12/1996 | Woll et al. ............. 364/424.04 |
| 5,610,337 A | * | 3/1997 | Nelson ..................... 200/61.46 |
| 5,719,771 A | * | 2/1998 | Buck et al. .................. 340/438 |
| 6,092,008 A | * | 7/2000 | Bateman ................. 244/158 R |
| 6,122,959 A | * | 9/2000 | Hoshal et al. .............. 702/141 |
| 2002/0018008 A1 | * | 2/2002 | Wright et al. ............... 340/945 |

* cited by examiner

Primary Examiner—Thomas G. Black
Assistant Examiner—Ronnie Mancho
(74) Attorney, Agent, or Firm—Olson & Hierl, Ltd.

(57) ABSTRACT

The present invention provides a method and apparatus for recording motion of a vehicle or a fixed structure with a self-contained motion recorder apparatus. The self-contained motion recorder apparatus is a sealed unit that contains a power source together with controller, sensor and recording devices. The controller device includes a power consumption manager that manages and conserves the overall power consumption of the apparatus. A sensor device is further included in operable communication with the controller device that produces signals that represent the motion of the vehicle or structure as a function of time. Additionally, a recording element is provided in operable communication with the controller for storing data that corresponds to the signals. A communication interface is further provided such that data may be read from the apparatus and commands and data may be written into the apparatus, from an external device.

31 Claims, 4 Drawing Sheets

MOTION DETECTION AND RECORDING METHOD AND APPARATUS

CROSS-REFERENCE TO RELATED APPLICATIONS

This application is a continuation-in-part of U.S. Ser. No. 09/259,782, filed on Mar. 1, 1999, now U.S. Pat. No. 6,266,588.

TECHNICAL FIELD OF THE INVENTION

This invention relates to a recording method and apparatus. More particularly, the present invention relates to a method and apparatus for recording motion events for stationary as well as moving structures.

BACKGROUND OF THE INVENTION

The insurance industry estimates the cost of property damage, bodily injury and related expenses for motor vehicle accidents exceed approximately $250 billion annually. This figure is only expected to increase. Moreover, the industry further estimates "low speed" collisions account for approximately 80% of all reported motor vehicle accidents.

Many of these low speed collisions are associated with subjective injuries. The expenses associated with such collisions and injuries could be dramatically reduced if the magnitude and severity of the accident were known. Generally, to determine the magnitude and severity, the accident must be "reconstructed".

Similar considerations apply to stationary structures such as buildings, bridges, and the like subjected to seismic events such as earthquakes, tidal waves, and the like, as well as to packages with a fragile contents.

In the area of automobile accident reconstruction, an accident analyst determines how an accident most probably occurred by measuring, among other factors, the length of the skid marks, the extent of vehicle and property damage, the weather, and the conditions of the road at the time of the accident. This method of reconstructing accidents has been shown at times to be both expensive and inaccurate.

Alternatively, most commercial aircraft are equipped with a "black box". This device records pertinent data from the aircraft's major subsystems as the aircraft is operating. If an accident occurs, the "black box" can generally be recovered and the recorded information extracted. This information can be used to determine the status of the subsystems just prior to the accident. Determining the status of the subsystems just prior to the accident can be used to reconstruct the events leading up to the accident, and assist the investigators in determining the accident's cause. Black box recording devices have proven invaluable in aviation accident reconstruction.

However, this type of technology is costly, and generally limited to large and expensive vehicles, such as aircraft. In addition, these types of devices must be able to survive the impact forces associated with aircraft accidents. These devices. tend to be too costly, too cumbersome and consume too much power to be acceptable for automobile use.

Numerous performance recording devices have been designed prior to the present invention, specifically for use with automobiles. Some typical devices are shown in U.S. Pat. No. 4,381,829 to Montaron, U.S. Pat. No. 5,430,432 to Camhi et al., U.S. Pat. No. 5,445,024 to Riley, Jr. et al., and U.S. Pat. No. 5,581,464 to Woll et al. However, until the present invention, such prior art devices did not disclose a self-contained apparatus suitable for long term use, i.e. one year or longer.

These prior art devices suffer from a number of drawbacks. Generally, these devices must be interconnected with the major subsystems of the automobile, i.e. power, ignition, steering, braking, etc. They are not self contained and are expensive to install and maintain. Additionally, providing a means for interconnection to the automobile subsystems provides a means for access to the device, so that tampering may occur. Moreover, those prior art devices that are truly self-contained have a short life span, i.e., on the order of several months, but at least less than one year.

Thus there is a need for a tamper-proof, self-contained recording apparatus and method that records and provides information useful for accident reconstruction and for reconstruction of forces experienced by a structure during seismic events such as earthquakes. There is further a need to provide such an apparatus and method that is easy to install and maintain and has a life span of one year or greater to coincide with the vehicle's annual service.

SUMMARY OF THE INVENTION

The present invention provides a new and useful recording method and apparatus for motion events experienced by moving as well as stationary structures. The present invention is a self-contained device that records and provides information useful for event reconstruction without requiring interconnection to any external power supply or source. The apparatus is adapted for mounting to the structure to be monitored, can be factory sealed, is self-contained and has a useful life of at least one year. The power supply for the apparatus is a battery that can be replaced or recharged, as desired.

The present invention comprises a sealed housing enclosing at least a controller device, sensors and. recording devices. The controller device includes a power consumption manager that manages and conserves the overall power of the apparatus. The sensor device is in operable communication with the controller device and generates signals representative of motion experienced by a stationary or normally moving or movable structure, such as a vehicle or a package being handled, during a predetermined time interval. Finally, the recording device, which is also in operable communication with the controller device, stores data that corresponds to the generated signals.

In a preferred embodiment, the present apparatus includes a power source in operable association with a power consumption manager. The power consumption manager operates the controller at a relatively high power consumption state while a predetermined event is detected, and at a relatively low power consumption state, or in a stop or wait mode, prior to and subsequent to, detection of the predetermined event.

Other contemplated features include a plurality of sensors, two recording elements (long and short term recording elements) and an external interface. The sensors monitor acceleration in at least two directions and generate signals. The two recording elements store the data or information that corresponds to the generated signals. In one preferred embodiment the recording elements store the data generated over a predetermined period of time immediately prior, during, and subsequent to the detection of the predetermined event. The interface also provides a means for externally accessing the information stored in at least one of the two recording elements.

The present invention further includes a method for recording motion using a sealed, self-contained recorder apparatus. The method includes sensing the acceleration of the structure along at least two directions and generating signals indicative thereof. It is further contemplated that information that corresponds to the signals generated over a predetermined period of time are recorded and stored, which signals are indicative of an accident-type event, a seismic event or an impact event. All of the above steps are controlled by a microprocessor or control logic circuits operating in a relatively high power consumption state when a predetermined acceleration is detected and in a relatively low power consumption state when it is not.

DESCRIPTION OF THE PREFERRED EMBODIMENT

The present invention is a reusable, sealed, self-contained battery powered unit that monitors and records linear acceleration of a structure which can be a fixed structure, e.g., a bridge, a building, and the like, or a movable or moving structure, e.g., a motor vehicle, a package being handled, and the like, in at least two horizontal directions, and angular acceleration in a horizontal plane defined by the two horizontal directions. The apparatus is adapted for mounting to the structure and is a sealed, self-contained battery powered unit requiring no external connections, i.e., no interconnection to the subsystems of the structure to which the apparatus is mounted. It can be mounted to the inside of the trunk, underside, firewall or the like, of a vehicle to record the vehicle's dynamics during a collision or any other kind of accident. It can be mounted to a structure such as a bridge or a building for monitoring of seismic events that may affect the structural integrity of the structure, or it can be included in a package with fragile contents. This data is stored in the apparatus and can be read out through an interface. After a period of use, e.g., a year, the apparatus may be returned to the factory for refurbishing. The recording device can then be cleared, the power source replaced or recharged, and the apparatus returned to service.

While this invention is susceptible of embodiments in many different forms, this specification and the accompanying drawings disclose only some specific forms as examples of the invention. The scope of the invention is not limited to the described examples or embodiments. The scope of the invention is pointed out in the appended claims.

Figure 1:
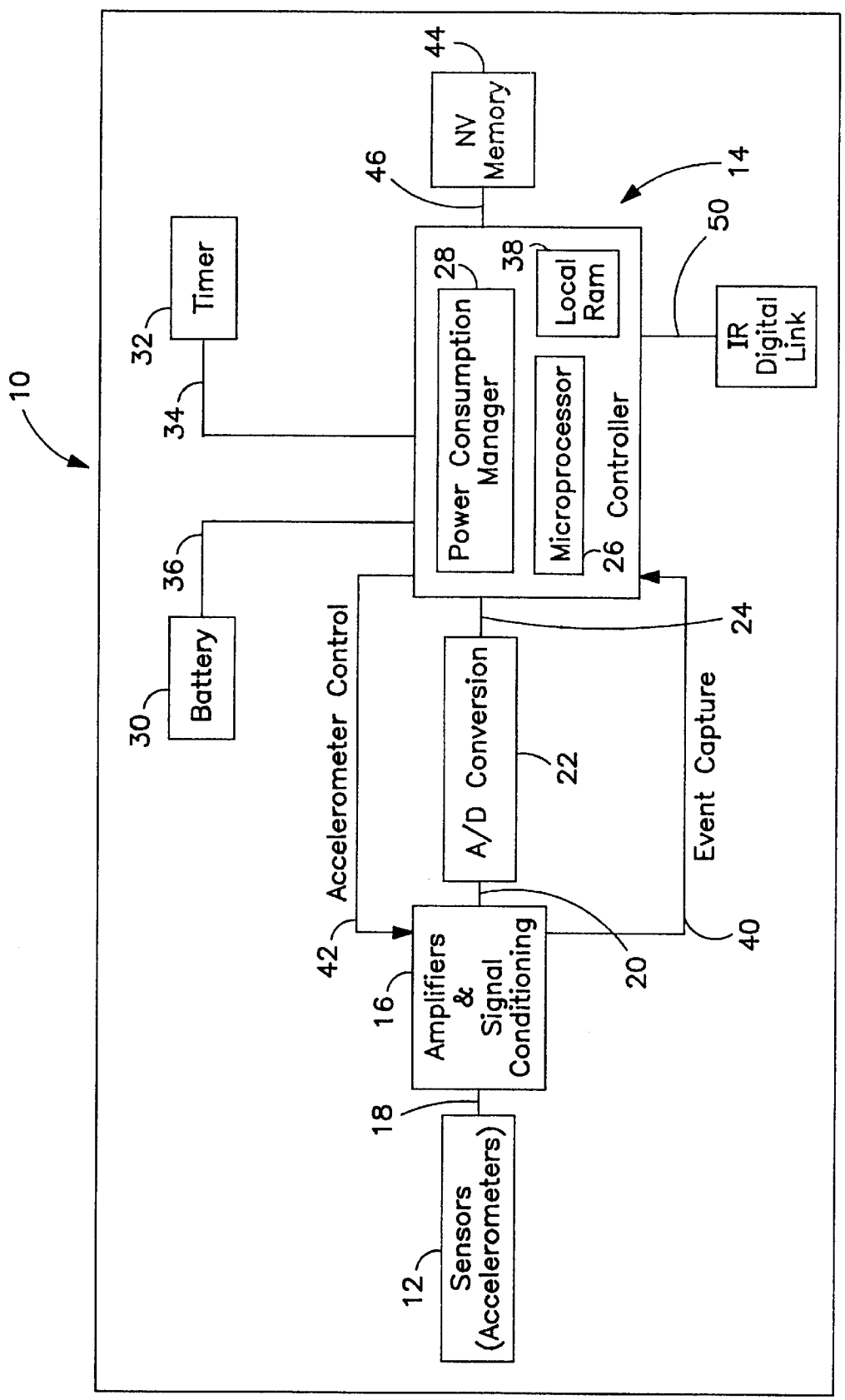
FIG. 1 is an overall block diagram of the recorder apparatus in accordance with the present invention.

Referring to FIG. 1, an overall block diagram of the recorder apparatus, generally designated 10, in accordance with the present invention is shown. Recorder 10 includes a sealed housing and a sensor device 12 in operable communication with a controller device 14, all contained in the housing. The sensor device 12 provides a means for monitoring a vehicle's linear acceleration in at least two horizontal directions and angular acceleration in a horizontal plane, where the horizontal plane is defined by the at least two horizontal direction (discussed in greater detail below).

The sensor device 12 produces continuous signals as a function of time, which are representative of the vehicle's performance or the movements experienced by the structure.

An amplifier device 16 is depicted coupled to the sensor device 12 by a first connection 18. Amplifier device 16 provides a means for amplifying and conditioning the signals generated by the sensor device 12 for transmission to the controller device 14 via an A/D device discussed below.

Additionally, the amplifier device 16 is operably coupled, by a second connection 20, to an A/D device 22. The A/D device 22 is an analog to digital converter, converting the analog signals generated by the sensor device 12 to digital signals that can be processed by the controller device 14. While the amplifier and A/D devices 16 and 22 are depicted as separate elements, it is contemplated that these elements could be combined into one integrated circuit, all of which are enclosed in the housing.

The controller device 14 is coupled to a A/D device 22 by third connection 24 and includes a microprocessor 26. It is preferred that the controller device 14 include a power consumption manager 28 whereby overall power consumption of the recorder 10 is managed and conserved. Preferably, the high frequency clock of microprocessor 26 is normally turned off (thus reducing the microprocessor's power consumption substantially to zero) but is turned on within about 10 microseconds when a collision, impact, or a seismic event is detected.

Preferably, power consumption manager 28 includes a power source 30 in operable association therewith. Additionally, a timer 32, used to keep track of the date and time, is shown operably associated with the controller 14, where timer 32 is connected to controller 14 by fourth connection 34. In the depicted embodiment, the power source 30 is a battery, joined to the controller 14 by a fifth connection 36.

While the power consumption manager 28 and microprocessor 26 are depicted as two separate elements, it is preferred that microprocessor 26 and power consumption manager 28 be integrated into one device, where preferably the power consumption manager 28 is software operating on microprocessor 26. Furthermore, any suitable power source 30 having a useful life of at least 1 year, but preferably 14–24 months, is contemplated, including a chemical battery, modified fuel cell, or the like.

In operation, the sensor device 12 monitors the linear acceleration of a structure in at least two principal (horizontal) directions, and angular acceleration in a horizontal plane, where the horizontal plane is defined by the two horizontal directions. When tripped, recording apparatus 10 powers up and records an event. Furthermore, the power consumption manager 28 periodically speeds up the apparatus 10 to update timer 32. That is, the power consumption manager 28 periodically operates the apparatus 10 at a predetermined clock speed to update the timer 32.

Sensor device 12 generates analog signals as a function of time representative of a structure's movements, especially the acceleration thereof. These signals are amplified and digitized by the amplifier device 16 and the A/D device 22 respectively, and transmitted to the microprocessor 26. In one preferred embodiment, the signals are temporarily stored as data representative of the generated signals, preferably in a temporary recording element or local RAM 38 incorporated into microprocessor 26. Temporary recording element 38 accumulates data until it is written as a block of data to a power independent recording element. This "event capture" identified in FIG. 1 by arrow 40, notifies the controller 14 that a significant event is in process and that recording should commence.

When necessary, the microprocessor 26 transmits digital control signals back to the sensor device 12 through the amplifier device 16. Such control signals may include signals to activate a particular sensor or adjust its sensitivity or speed. This operation is termed "accelerometer control" identified in FIG. 1 by arrow 42.

A recording element 44 is contemplated for storing the data representative of the generated signals. Recording element 44 is contained in the housing and operably coupled to the controller device 14 by sixth connection 46. Recording element 44 is a nonvolatile memory storage device having sufficient memory to store the acceleration data.

In one preferred embodiment, the recorded events generated over a predetermined period of time are stored when a predetermined event is detected, and notification occurs, indicated as an "event capture" by arrow 40. In one implementation, it is contemplated that five recorded events of one second each are stored, but recordation of various numbers and lengths of events or event scenarios are contemplated. In the depicted embodiment, the recorded event consists of signals stored for a predetermined time period prior to the detection of the predetermined event and continues for a predetermined time period thereafter. Each event is stored with a time and date stamp.

An interface device 48, operably connected to the controller device 14 by a seventh connector 50, is further contemplated. The interface device 48 provides a means for externally interacting with the controller device 14 when sealed in the housing. While many types of interface devices 48 are contemplated, including a device that provides for a direct cable datalink hookup, preferably interface device 48 is a device that allows for a noncontact, wireless interface and includes a microwave or infrared interface.

After being sealed in the housing, the controller device 14 is contacted, and the power source 30 activated, using the interface device 48. Moreover, the stored signals can be downloaded from the recording element 44 using the interface device 48 without opening the housing.

Figure 2:
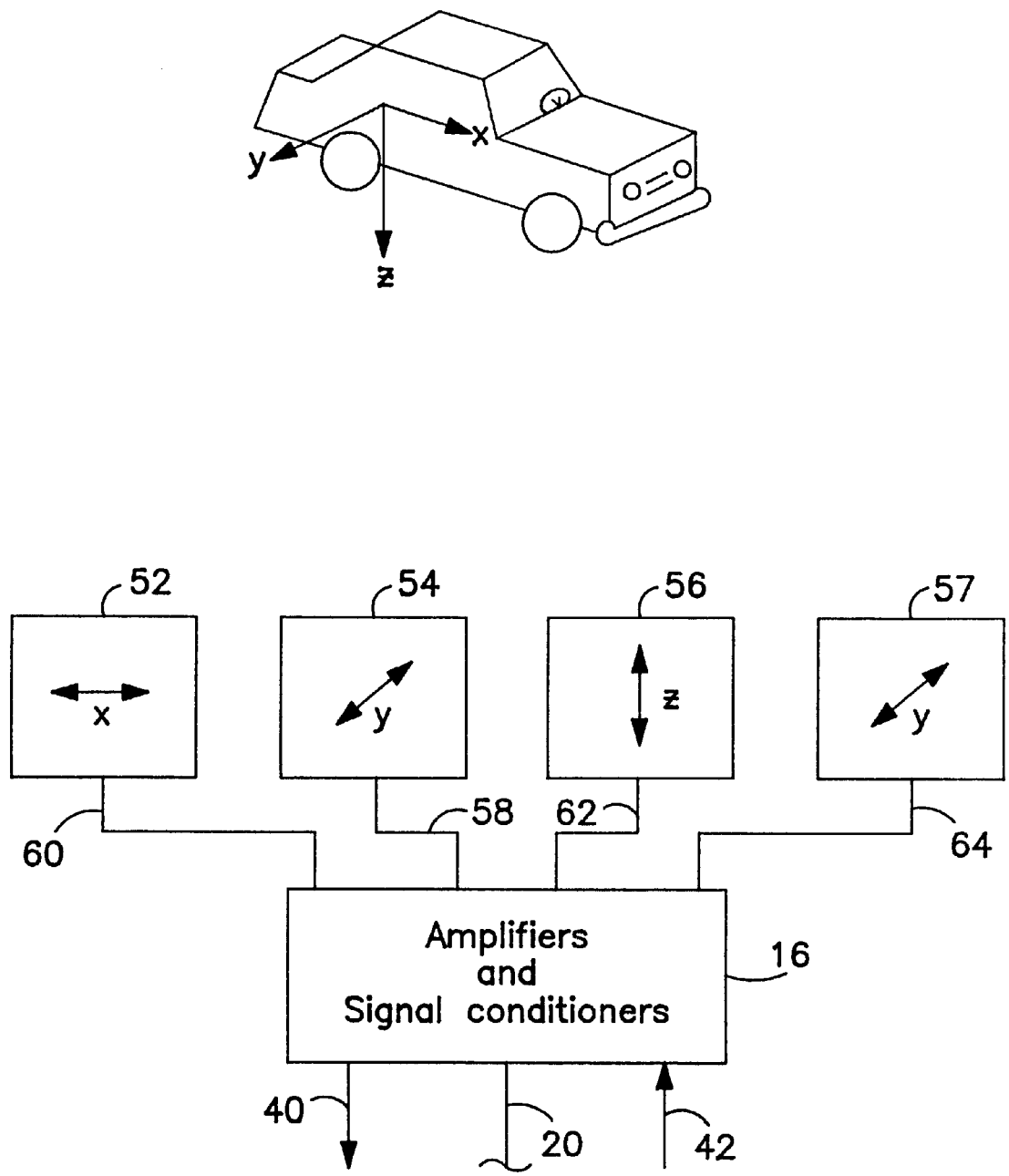
FIG. 2 is a block diagram of the sensor array of FIG. 1 in accordance with the present invention.

Turning now to FIG. 2, the sensor device 12 is explained in greater detail. Sensor device 12 includes a plurality of sensors operable to produce the succession of signals representative of the movements experienced by the structure. While it is contemplated that sensor device 12 include two sensors for monitoring acceleration in at least two directions, it is preferred that four sensors or more be used for monitoring acceleration in different directions.

As provided above, sensor device 12 monitors linear acceleration in at least two principal (horizontal) directions and angular acceleration in a horizontal plane defined by the principal directions. The sensor device 12 includes at least four sensors, first, second, third and fourth sensors 52, 54, 56 and 57, that detect acceleration in different directions. For the purposes of discussion only, the directions are indicated as corresponding to the x-y-z directions of a conventional Cartesian coordinate system, where each of the three directions are orthogonal to each other.

As depicted in FIG. 2, the second sensor 54, operably coupled to the amplifier device 16 by eighth connection 58, is depicted as monitoring acceleration in a lateral direction, depicted along the y-direction. Likewise, first sensor 52, coupled to the amplifier device 16 by ninth connection 60, is depicted as monitoring acceleration in a longitudinal/direction, along the x-direction. The third sensor 56, coupled to amplifier device 16 by the tenth connection 62, monitors acceleration in the vertical direction, along the z-direction.

Finally, fourth sensor 57, coupled to the amplifier device 16 by eleventh connection 64, is depicted as monitoring linear acceleration in the lateral direction parallel to the y-direction. Angular acceleration about the vertical direction is obtained from the differential acceleration of two accelerometers oriented in the same y-direction, but separated some predetermined physical distance along the x-direction.

The present invention is not limited to the x-y-z coordinate system. It is contemplated that the present invention can be used to monitor acceleration in any two horizontal directions and angular acceleration in a horizontal plane as defined by the vehicle, as will be recognized by those skilled in the art.

While any type of sensors are contemplated, accelerometers are preferred. An example of a suitable accelerometer is provided in U.S. Pat. No. 5,524,489 to Twigg.

Figure 3:
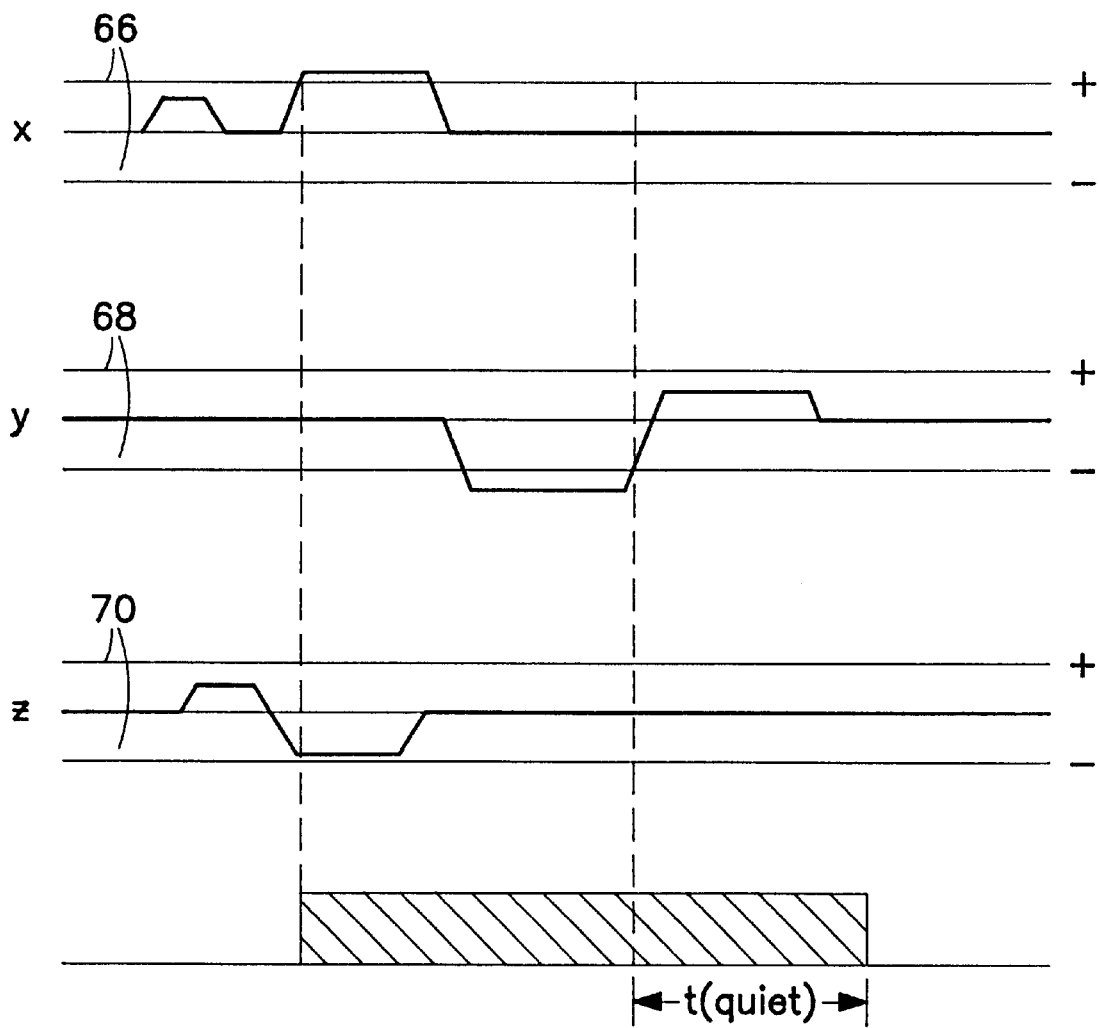
FIG. 3 is a timing diagram of the clock speed status in relation to the sensor output in accordance with the present invention.
Figure 4:
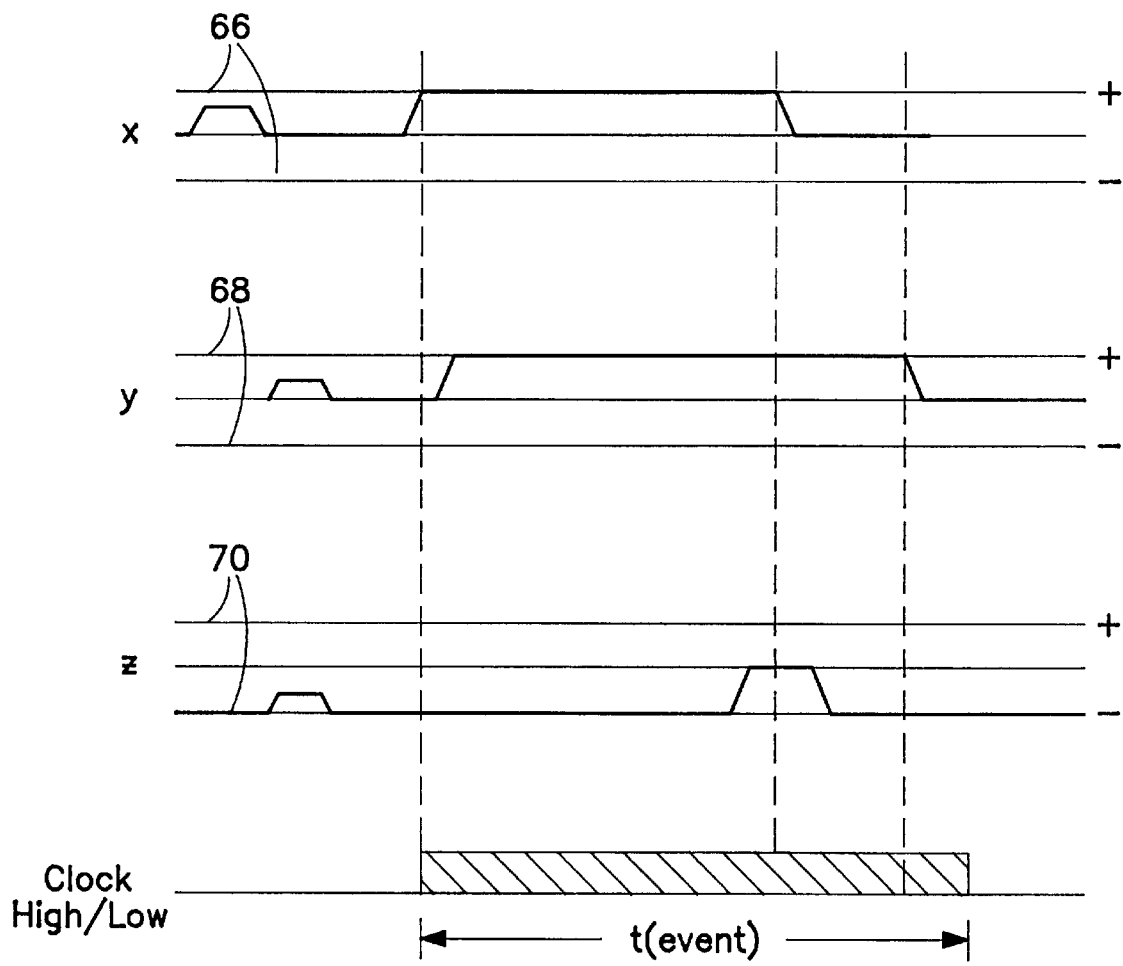
FIG. 4 is a second timing diagram of the clock speed status in relation to the sensor output in accordance with the present invention.

Operation of the power consumption manager 28 is better understood upon reviewing FIGS. 3 and 4. FIGS. 3 and 4 depicts a timing diagram of the clock speed status in relation to the sensor output.

The power consumption manager 28 generally operates the controller device 14 in a "sleep mode". In this mode, the microprocessor 26 operates in a low power consumption state, preferably operating at a low clock speed or stop mode, conserving power. However, the power consumption manager 28 periodically operates the microprocessor 26 in a high power consumption state, preferably at a high clock speed to update timer 32. In addition, while in the sleep mode, the sensor device 12, operates two sensors, the first and second sensors 52 and 54 for example, monitoring acceleration in two principal directions.

When amplifier device 16, connected to sensor device 12 detects a predetermined event, it notifies the controller 14 via the "event capture" signal, represented by arrow 40. The power consumption manager 28 operates the microprocessor 26 in a high power consumption mode, preferably operating at a high clock speed or "run mode". This high clock speed is significantly faster (for example, about 50 times faster) than the low clock speed in the sleep mode. The recording device 10, operating at the high clock speed, in addition to operating all four or more sensors 52, 54, 56, and 57 as well as the recording element 44, will correspondingly consume more power.

The predetermined event criteria can be a predetermined wake-up threshold acceleration, represented in FIGS. 3 and 4 by lines 66, 68 and 70. Preferably the predetermined event is defined as the predetermined wake-up threshold acceleration and predetermined shutdown threshold acceleration. In the depicted embodiment, the predetermined wake-up and shutdown threshold accelerations are the same. However, it is contemplated that these two threshold accelerations can differ and can be arbitrarily set as desired.

Once the predetermined wake-up threshold acceleration is detected, recorder apparatus 10 is operated in the run mode. Moreover, the recorder apparatus 10 remains in the run mode until the acceleration drops below the predetermined shutdown threshold acceleration for some period of predetermined time. The recorder apparatus 10 then enters the sleep mode until the next predetermined wake-up threshold acceleration is detected, if any.

The controller device 14, and thus the recorder apparatus 10, will remain in the low power consumption state a vast majority of the time, i.e., as long as the predetermined criteria or event is not detected, by operating at a low clock speed or in a "sleep mode". Whenever the acceleration meets or exceeds the predetermined criteria or event, a recordable "event" occurs. In one implementation, a recordable event is triggered whenever any of the acceleration signals exceed a predetermined threshold value (lines 66, 68 and 70).

During such-event, the controller device 14 enters a run mode and begins to operate at a higher clock speed, with consequently greater power consumption. The controller 14 and the recording apparatus 10 remain in this high power consuming run mode until the end of the recordable event is detected. In one implementation, the recordable event is determined to be over if no significantly large accelerations are detected or observed for a predetermined time interval ($t_{(quiet)}$). In another implementation, it is contemplated that the recorded event time is a fixed, predetermined time duration ($t_{(events)}$). Once the event has ended, the controller 14 and the recording apparatus 10 revert to the low power consumption state.

Having observed the details of the apparatus, attention may now be given to the housing. While any material is contemplated, the housing is preferably made of polycarbonate, ABS or acrylic, that can be welded closed or otherwise sealed at the factory. The material should be preferably resistant to oil, gasoline and road salt, able to survive significant temperatures and temperature differentials.

Use of the Recording Apparatus

The present device is assembled, calibrated and sealed at the factory site. At this time, the criteria used to determine the start and end of a recordable event, for example, in one embodiment the predetermined thresholds, may be set. It is contemplated that different criteria, i.e., different thresholds, may be selected for each sensor or combination of sensors. The device is shipped to the installation site and in a selected location on the structure. In the case of a motor vehicle, it can be mounted to the inside of the trunk, underside, firewall or other suitable mounting surface of the vehicle using cable ties or other suitable attachment methods. Recorder apparatus 10 so mounted is now able to record vehicle dynamics during a collision.

Recorder apparatus 10 is then activated using the external interface device 48. Again, it is contemplated that the predetermined thresholds for, the sensors are determined and set during assembly or installation. The recorder apparatus 10 can now be considered armed, able to record vehicle dynamics during a collision or movement of a structure during a seismic event or, in case of a package, during handling.

Sensor device 12 monitors and senses linear acceleration in at least two principal directions. Sensor,device 12 generates analog signals as a function of time representative of motion, specifically acceleration. These signals are detected, amplified and digitized by the amplifier device 16 and the A/D device 22 respectively, and transmitted to the microprocessor 26. In one preferred embodiment, the signals are temporarily recorded and stored as data in a temporary recording element 38 incorporated into controller 14.

The power consumption manager 28 operates the controller device 14 in the sleep mode. When the amplifier device'16, connected to sensor device 12, detects a predetermined event, the power consumption manager 28 operates the microprocessor 26 in the run mode which is significantly faster (in one embodiment, about 50 times faster) than the sleep mode, in addition to operating all the sensors.

After the predetermined event is detected, the data temporarily recorded and stored in the temporary recording element 38 are recorded in the recording element 44. The data recorded and stored in the recording element 44 may be accessed and downloaded using the interface device 48 at some later time.

By virtue of the present invention, the described objectives are met. The present invention provides a substantially tamper-proof, self-contained recording apparatus and method that records and provides information useful for accident reconstruction. The present apparatus and method is easy to install, requires no maintenance, and the power source has a life span of one year or greater.

We claim:

1. A self-contained motion recorder apparatus free from any interconnections with any exterior subsystems and comprising:

a sealed housing;

a controller device including a power consumption manager contained in said housing;

a sensor device in operable communication with said controller device and contained in said housing, operative to produce signals as a function of time representative of motion experienced by said housing;

a recording device in operable communication with said controller for storing data corresponding to said signals and contained in said housing; and power supply in said housing for said controller device, said sensor device, and said recording device.

2. The recorder apparatus of claim 1 wherein said power consumption manager is in operable association with a power source and a microprocessor.

3. The recorder apparatus of claim 2 wherein said power consumption manager operates said controller device in a high power consumption state while a predetermined event is detected.

4. The recorder apparatus of claim 3 wherein said power consumption manager operates said controller device in a low power consumption state, compared to said high power consumption state, prior and subsequent to detection of said predetermined event.

5. The recorder apparatus of claim 3 wherein said power consumption manager operates said controller device in a low power consumption state, compared to said high power consumption state, when said predetermined event is not detected.

6. The recorder apparatus of claim 3 wherein said power consumption manager operates said controller device in a stop mode prior and subsequent to detection of said predetermined event.

7. The recorder apparatus of claim 4 wherein said power consumption manager periodically operates said controller device at a predetermined clock speed to update a timing device.

8. The recorder apparatus of claim 4 wherein said predetermined event is at least one acceleration at a predetermined acceleration threshold.

9. The recorder apparatus of claim 4 wherein said sensor device includes a plurality of sensors operative to produce said signals.

10. The recorder apparatus of claim 9 wherein said sensor device includes at least two sensors for monitoring acceleration in at least two directions.

11. The recorder apparatus of claim 9 wherein said sensor device includes four sensors for monitoring acceleration in different directions, wherein at least two sensors are oriented in a same direction and separated by a predetermined distance, whereby angular acceleration is detected.

12. The recorder apparatus of claim 9 wherein said sensors are accelerometers.

13. The recorder apparatus of claim 9 wherein said recording device includes a first recording element suitable for storing data corresponding to said signals generated over a predetermined period of time immediately prior and subsequent to detection of said predetermined event, said first recording element in operable communication with said controller device and contained in said housing.

14. The recorder apparatus of claim 13 wherein said recording device further includes a second recording element suitable for storing data corresponding to said signals in a power independent manner in operable communication with said sensor device and said controller device and contained in said housing.

15. The recording apparatus of claim 14 wherein said second recording element is a nonvolatile memory.

16. The recorder apparatus of claim 13 further including an interface for externally accessing data stored in the recorder apparatus.

17. The recording apparatus of claim 16 wherein said interface provides wireless access to said data.

18. A reusable self-contained motion recorder apparatus free from any interconnections with any exterior subsystems and comprising:
   a sealed housing adapted for mounting to a structure;
   a controller contained in said sealed housing;
   a battery in operable communication with said controller and contained in said housing;
   a battery manager operably associated with said battery and said controller and contained in said housing, whereby said battery manager operates said controller in a high power consumption mode only when sensor data is being recorded;
   a sensor device having a plurality of sensors in operable communication with said controller and contained in said housing, whereby said sensor device is operative to produce signals as a function of time and representative of motion by the structure; and
   a recording device in operable communication with said controller and contained in said housing whereby data corresponding to said signals are stored.

19. The recorder apparatus of claim 18 wherein said battery manager further operates said controller in a low power consumption mode when sensor data is not being recorded.

20. The recorder apparatus of claim 18 wherein said battery manager further operates said controller in a low power consumption mode prior and subsequent to said sensor data being recorded.

21. The recorder apparatus of claim 18 wherein said battery manager further operates said controller in a stop mode prior and subsequent to said sensor data being recorded.

22. The recorder apparatus of claim 19 wherein said plurality of sensors monitor the structure's acceleration in at least two directions.

23. The recorder apparatus of claim 22 wherein said recording device further includes a first recording element suitable for recording data corresponding to said signals generated over a predetermined time period immediately prior and subsequent to said sensor data being recorded, wherein said first recording element is in operable communication with said controller and contained in said housing.

24. The recorder apparatus of claim 23 wherein said recording device includes a second recording element suitable for storing data corresponding to said signals in a power independent manner in operable communication with said sensor device and said controller and contained in said housing.

25. The recorder apparatus of claim 24 wherein said second recording element is a nonvolatile memory.

26. The recorder apparatus of claim 24 further including an external interface for accessing data stored in the recorder apparatus.

27. A method for recording movement of a structure using a sealed, self-contained recorder free from any interconnections with any exterior subsystems and comprising:
   sensing acceleration of a structure along at least two directions and generating signals as a function of time representative of at least said acceleration;
   recording data corresponding to said signals generated over a predetermined period of time;
   controlling said sensing and recording steps using a microprocessor; and
   operating said microprocessor in a high powered consumption state while a predetermined acceleration is detected and in a lower power consumption state when said predetermined acceleration is not detected.

28. The method of claim 27 wherein said operating step comprises operating said microprocessor in said high power consumption state when said predetermined acceleration is detected and in a sleep mode when said predetermined acceleration is not detected.

29. The method of claim 27 wherein said operating step comprises operating said microprocessor in said high power consumption state when said predetermined acceleration is detected and in a stop mode when said predetermined acceleration is not detected.

30. The method of claim 28 further comprising recording said signals in a first recording element.

31. The method of claim 30 further comprising recording said signals generated over said predetermined period of time immediately prior and subsequent to detection of said predetermined acceleration in a second, nonvolatile recording element.

\* \* \* \* \*